United States Patent

Blendermann et al.

[19]

[11] Patent Number: 6,151,666
[45] Date of Patent: Nov. 21, 2000

[54] METHOD FOR RECLAIMING FRAGMENTED SPACE ON A PHYSICAL DATA STORAGE CARTRIDGE

[75] Inventors: Stephen H. Blendermann; Alan Ray Sutton, both of Boulder, Colo.

[73] Assignee: Storage Technology Corporation, Louisville, Colo.

[21] Appl. No.: 09/085,192

[22] Filed: May 27, 1998

[51] Int. Cl.⁷ .................................................. G06F 12/00
[52] U.S. Cl. ........................ 711/170; 711/171; 711/172; 711/173
[58] Field of Search ................... 711/170–173; 707/205, 206, 101, 200

[56] References Cited

U.S. PATENT DOCUMENTS

| | | | |
|---|---|---|---|
| 5,276,867 | 1/1994 | Kenley et al. | 707/204 |
| 5,479,656 | 12/1995 | Rawlings, III | 707/200 |
| 5,646,871 | 7/1997 | Cadot | 702/1 |
| 5,778,392 | 7/1998 | Stockman et al. | 707/205 |
| 5,802,599 | 9/1998 | Cabrera et al. | 711/170 |

FOREIGN PATENT DOCUMENTS

| | | |
|---|---|---|
| 0150705A2 | 1/1985 | European Pat. Off. . |
| 0150705A3 | 1/1985 | European Pat. Off. . |
| 0969383A2 | 6/1991 | European Pat. Off. . |
| 99/61987 | 5/1998 | WIPO . |

*Primary Examiner*—John W. Cabeca
*Assistant Examiner*—Brian R. Peugh
*Attorney, Agent, or Firm*—Brooks & Kushman P.C.

[57] ABSTRACT

The present invention provides a method for selectively reclaiming fragmented space on a multiple volume cartridge (MVC) device using a cost-benefit type analysis to determine whether making the fragmented space useable justifies moving all nonexpired data volume sets to another MVC. The present invention analyzes the allocation of space on the MVC to determine the location and size of any gaps between nonexpired data volume sets. Any gaps appearing at the end of the MVC are automatically reallocated for subsequent use. Any gaps appearing between nonexpired data volume sets are analyzed to determine whether the size and location meet predetermined criteria before moving any of the nonexpired data volume sets. In addition, the present invention allows selective movement of less than all of the nonexpired data volume sets if the size of the separating gap is larger than any nonexpired data volume sets appearing after the gap.

6 Claims, 1 Drawing Sheet

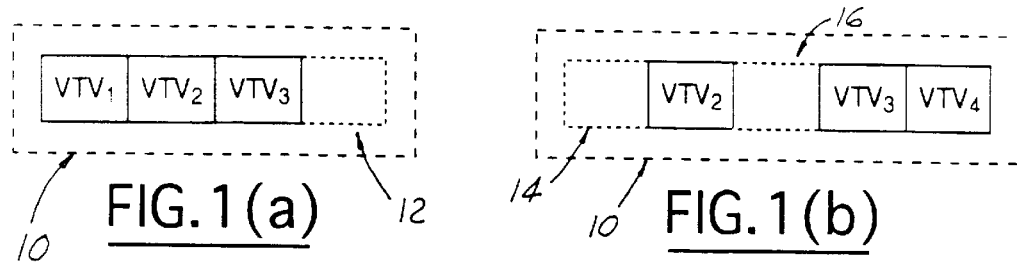
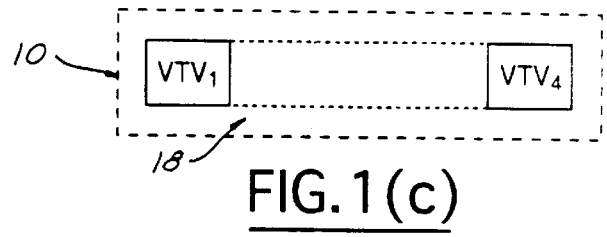
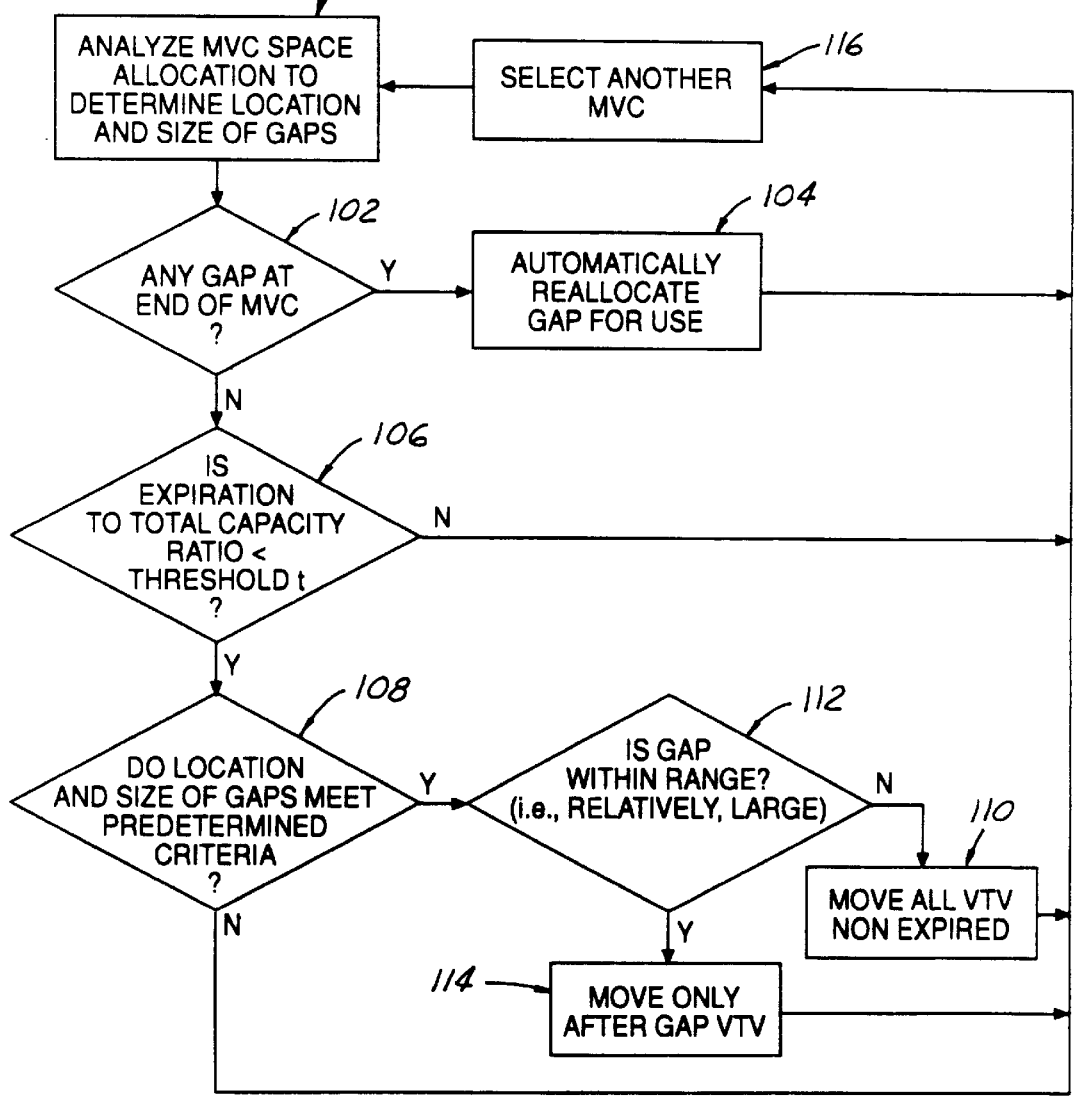
FIG. 2

METHOD FOR RECLAIMING FRAGMENTED SPACE ON A PHYSICAL DATA STORAGE CARTRIDGE

TECHNICAL FIELD

The present invention relates generally to multiple volume cartridge (MVC) devices, and more specifically to an improved method for reclaiming fragmented space on an MVC device.

BACKGROUND ART

Generally, automated cartridge systems (ACS) provide a mechanism by which multiple users in a data processing system can have common access to multiple data storage subsystems, such as multiple volume cartridge (MVC) devices. In conventional MVC devices, transfer of data sets generated by remote user computer terminals for storage on a particular cartridge is performed using a first-in-first-out (FIFO) placement of such data sets, or volumes, on the cartridge based on the time a data set is created or transferred.

While processing is made easier, the problem with such FIFO arrangements relate to the inability to efficiently utilize the physical space on the cartridge whenever earlier stored data sets expire before later stored data sets. When this situation occurs, unusable gaps in data storage media of the MVC device are formed between nonexpired volume data sets.

In order to provide some measure of recovery of such unusable gaps, known management arrangements automatically move all nonexpired data volumes on a particular MVC to a second MVC whenever the ratio of the amount of nonexpired data to the total data capacity on a cartridge falls below a predetermined threshold.

While moving nonexpired data volumes allows reclamation of the fragmented and unusable space or gaps on the first MVC, such a solution is not fully satisfactory because each move requires a considerable amount of processing time to complete, and produces additional physical wear on the MVC components. As a result, a need exists for an improved method for reclaiming fragmented space on a MVC which can minimize the frequency of data movement from one MVC to another, and improve overall efficiency in MVC space utilization.

DISCLOSURE OF THE INVENTION

It is therefore an object of the present invention to provide an improved method for reclaiming fragmented space on a MVC device which selectively controls movement of nonexpired data in accordance with a set of preferential criteria to minimize the necessity and frequency of moves.

It is another object of the present invention to provide a method for reclaiming fragmented space on a MVC device which automatically reclaims any space at the end of the MVC device without moving any nonexpired data stored thereon.

It is still another object of the present invention to provide a method for reclaiming fragmented space on a MVC device which analyzes location and size of gaps between nonexpired data stored thereon to determine the benefit of moving all nonexpired data to another MVC device to allow reclamation of the gaps for data storage.

In accordance with these and other objects, the present invention provides a method for reclaiming fragmented space on a MVC device which analyzes allocation of space on the MVC device to determine location and size of any gaps in nonexpired data stored thereon, and upon finding any gap(s), applying a set of preferential criteria in a cost/benefit type analysis to discriminate whether movement of nonexpired data to another MVC device is necessary to reclaim the gap(s), and whether reclaiming of the gap(s) is worth such data movement.

In accordance with one aspect of the present invention, a method for selectively reclaiming fragmented space on a multiple volume cartridge device includes analyzing a current allocation of space on the multiple volume cartridge device to determine the location and size of any gaps appearing between nonexpired data volume sets, and determining if a ratio of total size of the nonexpired data volume sets to total capacity of the multiple volume cartridge device is below a predetermined threshold. If the ratio is below the threshold, a cost/benefit analysis is performed based on the size and location of any gaps relative to the nonexpired data volume sets to determine whether to move the nonexpired data volume sets to another multiple volume cartridge device.

In accordance with other aspects of the present invention, the method can provide for determining whether a gap has appeared at the end of the multiple volume cartridge device, and automatically reallocating the end gap for data storage without moving any of the nonexpired data volume sets. In addition, the method of performing a cost/benefit analysis is performed by determining whether the location and size of any gaps appearing between the nonexpired data volume sets are within a predetermined range indicative that a move of all nonexpired data volume sets to another multiple volume cartridge device is desirable. Further, the method can limit movement to just the nonexpired data volume sets appearing after a gap if the size of the gap between nonexpired data volume sets is larger than the size of all nonexpired data volume sets appearing after the gap.

With such an arrangement, the frequency of data movement between MVC devices can be intelligently minimized on an as needed basis, thereby improving overall efficiency in MVC space allocation.

These and other objects, features, and advantages of the present invention will be readily apparent from the following detailed description of the best mode for carrying out the invention when taken in connection with the accompanying drawings.

BRIEF DESCRIPTION OF THE DRAWINGS

FIGS. 1(a)–(c) are diagrams illustrating examples of selective MVC gap reclamation in accordance with the present invention; and FIG. 2 is a flowchart showing the overall process of the present invention.

BEST MODE FOR CARRYING OUT THE INVENTION

The overall method of the present invention will now be described in connection with FIGS. 1(a)–(c) and 2. More specifically, as denoted at block 100, the present invention includes a suitable control processor (not shown) programmed to continuously or periodically analyze on an as needed basis the allocation of space on each multiple volume cartridge (MVC) device 10 in the ACS system. The analysis process identifies the location and size of any gaps between nonexpired data volumes which have arisen as a result of previously stored data volumes expiring. In accordance with a preferred embodiment, the stored data volumes are in the form of virtual tape volumes (VTV).

FIGS. 1(a)–(c) illustrate three different examples of gap locations which can arise. FIG. 1(a) represents a situation where a gap 12 has appeared at the end of a series of stored data VTV1–VTV3. If this situation is detected as denoted at block 102, then at block 104 the present invention will automatically reallocate for use, i.e., "instantaneous reclamation" of gap 12 for any newly received VTV without moving any of the other stored data VTV1–VTV3. Such reuse can be subject to certain restrictions, such as storing the new VTV in gap 12 only if the new VTV expires before the last data volume, i.e., VTV3, or the system has determined there is no other place to store the new VTV. Otherwise, the new VTV can be stored in another MVC device.

FIG. 1(b) represents a situation where relatively small gaps 14 and 16 have appeared in front of and between a series of stored data VTV2–VTV4. In this situation, the present invention applies a set of decisional criteria to effect a cost/benefit type analysis of moving the nonexpired stored data to make gaps 14 and 16 reusable. One such criteria as denoted at block 106 is determining whether the ratio of the size of nonexpired VTVs to the size of total storage capacity of MVC 10 has fallen below a predetermined threshold t. If so, at block 108 the process will analyze whether the size and location of the gaps 14 and 16 on MVC 10 warrant moving VTV2–VTV4 to another MVC device. Various different predetermined factors can be used in making this decision, such as the amount of space needed for newly received data, the expiration times for the remaining nonexpired VTV2–VTV4, overall system throughput and processing capability, and each factor can be customized based on a particular application. As denoted at block 110, if all criteria are met, all nonexpired VTVs will be moved to another MVC device to make gaps 14 and 16 reusable.

FIG. 1(c) represents a situation where a relatively large gap 18 separates a VTV1 and VTV4. As with the situation in FIG. 1 (b), the ratio of the size of nonexpired VTVs to the size of total storage capacity of MVC 10 is checked at block 106, and the size and location of gap 18 is analyzed at block 108 to determine the benefit of moving the nonexpired VTVs to another MVC device. However, in accordance with the present invention, one additional factor as represented at block 112 is determining whether the size and location of gap 18 is within a predetermined range indicative of gap 18 being relatively large compared to the size of the nonexpired data at the end of the gap, i.e., VTV4. If so, then only VTV4 would be moved at block 114 to another MVC, thereby allowing reclamation of gap 18 with minimum movement of data. As denoted at block 116, another MVC can be selected.

Thus, the present invention advantageously provides a method for reclaiming fragmented space on a MVC device which does not rely solely on the amount of unusable space, but also on the size and location of any gaps in nonexpired data, thereby allowing selective discrimination of whether the fragmented space is worth reclaiming. This arrangement also advantageously eliminates the need to move all nonexpired data before any space can be reclaimed. In addition, when used in conjunction with a process which selectively places data sets on a MVC device to significantly maximize the likelihood that all gaps in the stored data will appear at the end of the cartridge, such as disclosed in commonly owned U.S. patent application Ser. No. 09/063,986 (97-047-TAP/STK97047PUS), filed on Apr. 21, 1998, further efficiency of MVC device space utilization is achieved.

While the best mode for carrying out the invention has been described in detail, those familiar with the art to which this invention relates will recognize various alternative designs and embodiments for practicing the invention as defined by the following claims.

What is claimed is:

1. A method for selectively reclaiming fragmented space on a multiple volume cartridge device comprising:

analyzing a current allocation of space on the multiple volume cartridge device to determine the location and size of any gaps appearing between nonexpired data volume sets;

determining if a ratio of total size of the nonexpired data volume sets to total capacity of the multiple volume cartridge device is below a predetermined threshold; and if the ratio is below the threshold, performing a cost/benefit type analysis based on the size and location of any gaps relative to the nonexpired data volume sets to determine whether to move the nonexpired data volume sets to another multiple volume cartridge device.

2. The method of claim 1 further comprising determining whether a gap has appeared at the end of the multiple volume cartridge device, and automatically reallocating the end gap for data storage without moving any of the nonexpired data volume sets.

3. The method of claim 1 wherein performing a cost/benefit analysis comprises determining whether the location and size of any gaps appearing between the nonexpired data volume sets satisfy a predetermined set of decisional factors indicative of whether movement of the nonexpired data volume sets is warranted, and moving the nonexpired data volume sets to another multiple volume cartridge device if all the decisional factors are satisfied.

4. A method for selectively reclaiming fragmented space on a multiple volume cartridge device comprising:

analyzing a current allocation of space on the multiple volume cartridge device to determine the location and size of any gaps appearing between nonexpired data volume sets;

determining if a ratio of total size of the nonexpired data volume sets to total capacity of the multiple volume cartridge device is below a predetermined threshold; and if the ratio is below the threshold, performing a cost/benefit type analysis based on the size and location of any gaps relative to the nonexpired data volume sets to determine whether to move the nonexpired data volume sets to another multiple volume cartridge device, wherein performing a cost/benefit analysis comprises determining whether the location and size of any gaps appearing between the nonexpired data volume sets are within a predetermined range, and moving the nonexpired data volume sets to another multiple volume cartridge device in response thereto wherein the method, further comprises determining whether the size of any gap between nonexpired data volume sets is larger than the size of all nonexpired data volume sets appearing after the gap, and moving only the nonexpired data volume sets appearing after the gap to another multiple volume cartridge device.

5. The method of claim 4 further comprising determining whether a gap has appeared at the end of the multiple volume cartridge device, and automatically reallocating the end gap for data storage without moving any of the nonexpired data volume sets.

6. The method of claim 3 wherein the predetermined set of decisional factors comprise an amount of space needed for newly received data, the expiration times for the remaining nonexpired data volume sets, and overall system throughput and processing capability.

* * * * *